(12) United States Patent
Waalkes et al.

(10) Patent No.: US 8,494,151 B2
(45) Date of Patent: *Jul. 23, 2013

(54) SYSTEM AND METHOD FOR BALANCING CALL SESSION ASSIGNMENTS ON AN AGENT CONSOLE

(75) Inventors: Adam Waalkes, Sammamish, WA (US); Gilad Odinak, Bellevue, WA (US); Haodong (Howard) Jiang, Issaquah, WA (US); Matthew Thorn, Seattle, WA (US); Tom McCann, North Bend, WA (US)

(73) Assignee: Intellisist, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/236,508

(22) Filed: Sep. 19, 2011

(65) Prior Publication Data

US 2012/0008763 A1    Jan. 12, 2012

Related U.S. Application Data

(63) Continuation of application No. 11/893,542, filed on Aug. 15, 2007, now Pat. No. 8,023,638.

(60) Provisional application No. 60/838,074, filed on Aug. 15, 2006.

(51) Int. Cl.
*H04M 3/523* (2006.01)

(52) U.S. Cl.
USPC ............ 379/265.11; 379/265.06; 379/265.07; 379/265.08; 379/265.14; 379/266.03; 379/266.07

(58) Field of Classification Search
USPC ............ 379/265.01, 265.02, 265.04, 266.07, 379/265.05–265.08, 265.11, 265.14, 266.01, 379/266.03
See application file for complete search history.

(56) References Cited

U.S. PATENT DOCUMENTS

| | | | | |
|---|---|---|---|---|
| 6,724,887 | B1 * | 4/2004 | Eilbacher et al. | 379/265.03 |
| 7,184,541 | B2 | 2/2007 | Tyagarajan et al. | |
| 8,023,638 | B2 * | 9/2011 | Waalkes et al. | 379/266.07 |
| 8,130,935 | B1 * | 3/2012 | Coughlan et al. | 379/265.07 |
| 2003/0007628 | A1 | 1/2003 | Vortman et al. | |
| 2003/0177009 | A1 * | 9/2003 | Odinak et al. | 704/260 |
| 2007/0121824 | A1 * | 5/2007 | Agapi et al. | 379/88.18 |

* cited by examiner

*Primary Examiner* — Harry Hong
(74) *Attorney, Agent, or Firm* — Patrick J. S. Inouye; Krista A. Wittman; Makiko Coffland

(57) ABSTRACT

A system and method for balancing call session assignments on an agent console is provided. Incoming call sessions and one or more agent consoles, each managed by an agent, are monitored. An absolute upper limit on a number of the call sessions allowed at each agent console at any given time is assigned. A load of call session assignments is balanced on each agent console. Objective conditions regarding call sessions already assigned to each agent are collected. Subjective conditions regarding the agent's opinion of a current call session are also collected. The objective and subjective conditions are evaluated against the absolute upper limit to determine a load factor. Each incoming call session is assigned to one such agent console based on the load factor.

16 Claims, 7 Drawing Sheets

Fig. 4.

SYSTEM AND METHOD FOR BALANCING CALL SESSION ASSIGNMENTS ON AN AGENT CONSOLE

CROSS-REFERENCE TO RELATED APPLICATION

This U.S. patent application is a continuation of U.S. patent application Ser. No. 11/893,542, filed Aug. 15, 2007, now U.S. Pat. No. 8,023,638, issued Sep. 20, 2011, which claims priority to U.S. Provisional Patent Application, Ser. No. 60/838,074, filed Aug. 15, 2006, the disclosures of which are incorporated by reference.

FIELD

The present invention relates in general to automated call center operation and, in particular, to a system and method for balancing call session assignments on an agent console.

BACKGROUND

Customer call centers, or simply, "call centers," are often the first point of contact for customers seeking direct assistance from manufacturers and service vendors. Call centers are reachable by telephone, including data network-based telephone services, such as Voice-Over-Internet (VoIP), and provide customer support and problem resolution. Although Worldwide Web- and email-based customer support are becoming increasingly available, call centers still offer a convenient and universally-accessible forum for remote customer assistance.

The timeliness and quality of service provided by call centers is critical to ensuring customer satisfaction, particularly where caller responses are generated through automation. Generally, the expectation level of callers is lower when they are aware that an automated system, rather than a live human agent, is providing assistance. However, customers become less tolerant of delays, particularly when the delays occur before every automated system-generated response. Minimizing delays is crucial, even when caller volume is high.

Caller delay times can decreased by having more agents available to handle customer calls. Each new call can be assigned to an agent preferably in an ordered fashion to allow cooperative and consistent call processing, even where the call volume is high. Each additional call that is assigned to an agent, though, can affect the agent's workload, which can, in turn, affect the delay times experienced by callers. As a result, simply adding more agents to handle calls can be a naïve and ineffective solution.

Determining true agent work load is contingent upon several independent and wide ranging factors, including agent experience, time of day, caller need, and so forth. Moreover, agent load cannot always be generated as an automated index, as the amount of time spent by an agent on each call is both an objective and subjective inquiry. Objective factors, such as the number of calls currently assigned, are readily determinable, but subjective timing considerations based on individual agent control, such as determining how soon an agent may be able to take additional callers, can complicate caller assignment.

Therefore, there is a need for an approach to efficiently assigning calls to agent consoles based on continually variable independent and agent discretionary conditions.

SUMMARY

Fixed limits are can be applied to each agent that provides service provisioning to individual callers to a call center through an agent console. The balancing of caller session assignments to agent consoles is continually evaluated by a centralized message server based upon an analysis of objective and subjective customer calling conditions against the fixed limits, if applicable. Those conditions that are objectively determinable are generally known to each agent console and the message server throughout the duration of the caller sessions. However, subjective conditions, based on the discretionary assessment of each responsible agent, are only available when provided by the agent. The subjective conditions can be weighed along with other available objective conditions into a normalized determination of agent session workload.

A further embodiment is a system and method for balancing call session assignments on an agent console. Incoming call sessions and one or more agent consoles, each managed by an agent, are monitored. An absolute upper limit on a number of the call sessions allowed at each agent console at any given time is assigned. A load of call session assignments is balanced on each agent console. Objective conditions regarding call sessions already assigned to each agent are collected. Subjective conditions regarding the agent's opinion of a current call session are also collected. The objective and subjective conditions are evaluated against the absolute upper limit to determine a load factor. Each incoming call session is assigned to one such agent console based on the load factor.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 4 is a screen diagram showing, by way of example, a view of an agent console for a live call session.

DETAILED DESCRIPTION

Automated Call Center Operational Environment

Figure 1:
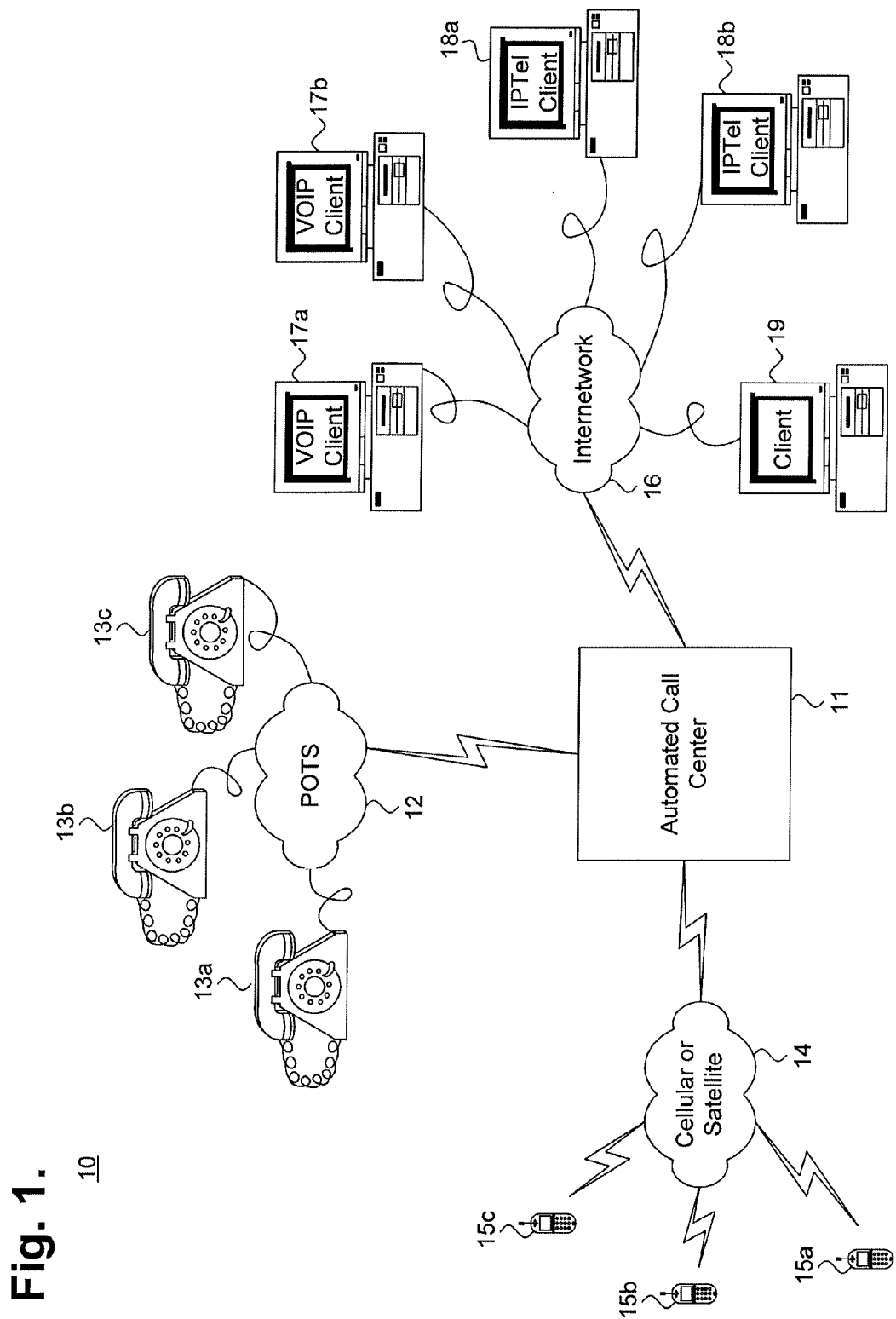
FIG. 1 is a functional block diagram showing an automated call center operational environment.

Automated call centers are a form of voice-response system, which rely upon programmed control to guide callers through a machine-generated dialogue for receiving support and problem resolution assistance. FIG. 1 is a functional block diagram showing an automated call center operational environment 10. By way of example, a multiplicity of callers call into an automated call center 11, generally through telephonic means, which can include conventional telephone handsets 13a-c through Plain Old Telephone Service (POTS) 12, portable handsets 15a-c through cellular and satellite telephone service 14, VoIP clients 17a-b, and Internet telephony clients 18a-b, as well as other forms and combinations of telephony, message, and voice-based communications. For example, a telephone caller may provide responses to the automated call center 11 through a combination of voice, dual-tone multi-frequency (DTMF), or text messaging. Callers can also "call" or interface into the automated call center 11 using conventional network clients 19 through an internetwork 17, including the Internet. Other types of automated call center access are possible.

Except as otherwise stated, as used herein, the terms "caller," "user," and "customer" are used interchangeably to refer to a caller to the automated call center 11. Similarly, the terms "agent," "guide," and "operator" are used interchangeably to refer to an agent that provides service provisioning to the caller for the automated call center 11. Additionally, although the automated call center 11 is shown as a single point within the automated call center operation environment 10, the automated call center 11 could include two or more logically interconnected but physically separate, including geographically removed, call center operations, which collectively provide a unified automated call center. Other automated call center arrangements and configurations are possible.

Automated Call Center

Figure 2:
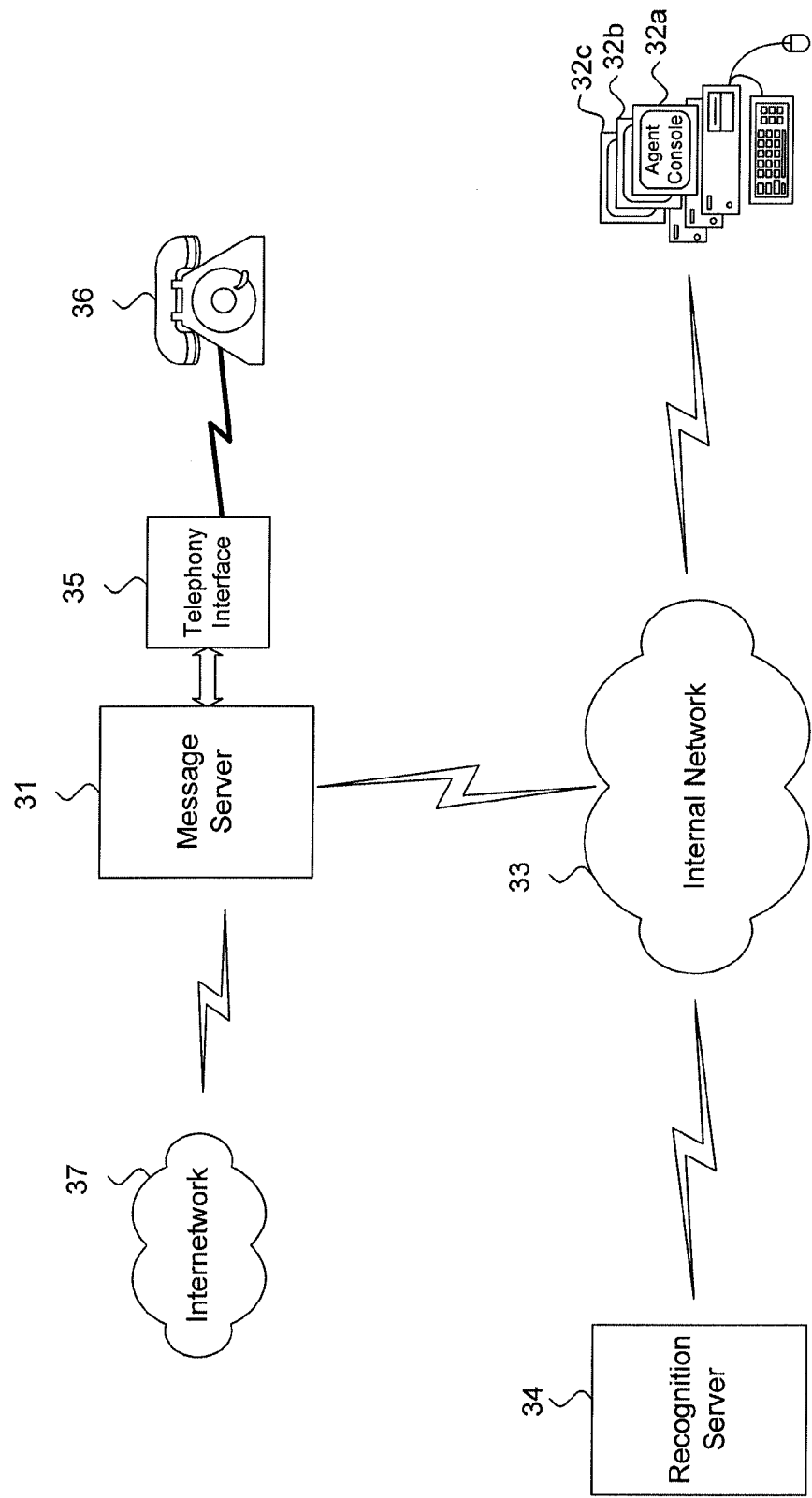
FIG. 2 is a functional block diagram showing the automated call center of FIG. 1.

Generally, an automated call center provides a single dial-in source for support and problem resolution assistance for customers seeking direct help from manufacturers and service vendors. However, automated call centers 11 can also be applied to many other diverse areas of commerce, such as mail order sales and roadside assistance dispatch. FIG. 2 is a functional block diagram showing an automated call center 30 for use in the automated call center operational environment 10 of FIG. 1. The automated call center 30 includes one or more servers 31, 34 and agent consoles 32a-c operatively interconnected over an internal network 33. The agent consoles 32a-c could also be interconnected to the message server 31 over an external network infrastructure 33, such as the Internet or a non-public enterprise data network. The network infrastructure 33 can be either wired or wireless and, in one embodiment, is implemented based on the Transmission Control Protocol/Internet Protocol (TCP/IP) network communications specification, although other types or combinations of networking implementations are possible. Similarly, other network topologies and arrangements are possible.

A message server 31 provides the primary message-based communications infrastructure for the call center operation, such as described in commonly-assigned U.S. Pat. No. 7,292,689, issued Nov. 6, 2007 to Odinak et al., and U.S. Patent Publication No. 2005/0177368, published Aug. 11, 2005 to Odinak, the disclosures of which are incorporated by reference. During regular operation, the message server 31 executes multiple threads to process multiple simultaneous calls, which are handled by agents executing agent applications on agent consoles 32a-c.

Customer calls are received through a telephony interface 35, which is operatively coupled to the message server 31 to provide access to a telephone voice and data network 36. In one embodiment, the telephony interface connects to the telephone network 36 over a T-1 carrier line, which can provide individual channels of voice or data traffic. Other types of telephone network connections are possible.

The automated call center 30 also includes a recognition server 34 that interfaces directly to the message server 31 as a top-level or root tier of a speech recognition hierarchy. The message server 31 sends streamed audio data for each user call to the recognition server 34, which then performs distributed speech recognition. The message server 31 assigns grammar generation and speech recognition to the recognition server 34. Upon startup, the telephony gateway 35 opens a T-1 carrier device channel for each available T-1 time slot. The telephony gateway 35 initiates a new connection to the message server 31, one connection per T-1 device channel, and the message server 31, in turn, initiates a corresponding new connection to the recognition server 34.

The separate telephony gateway-to-message server and message server-to-main recognizer connections form one concurrent session apiece. When a customer call is answered or connected, the telephony gateway 35 sends a call message to the message server 31. The message server 31 then sends a new call message to the recognition server 34.

Figure 5:
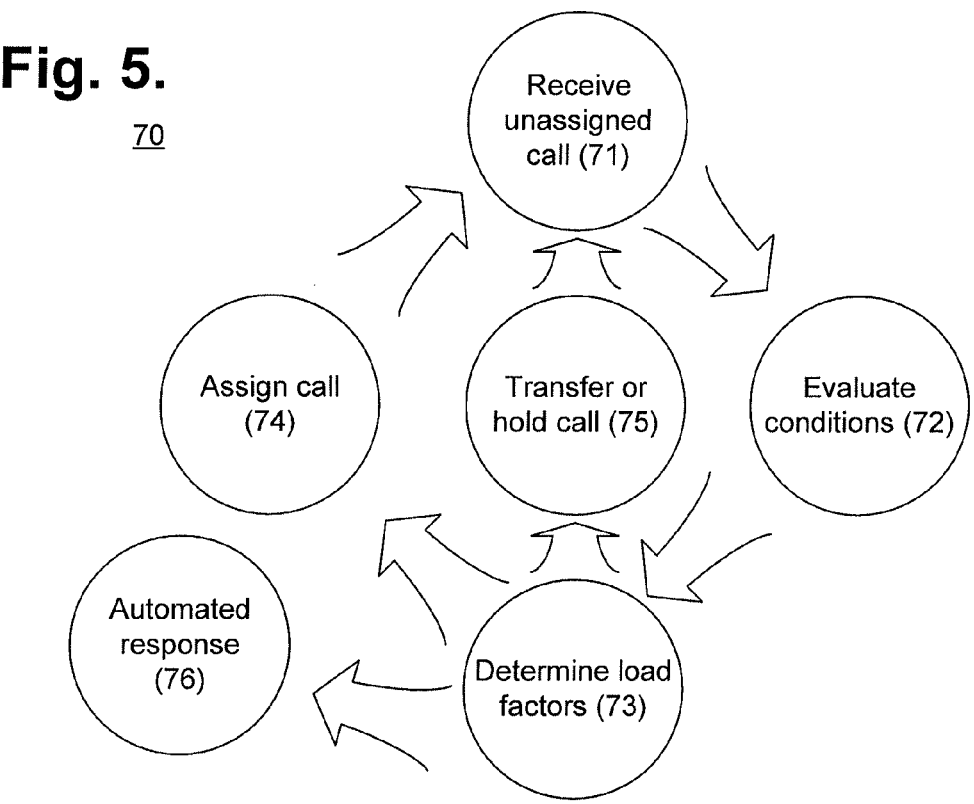
FIG. 5 is a process flow diagram showing a method for balancing agent console load during automated call processing, in accordance with one embodiment.

The message server 31 also assigns each new call to one of the agent consoles 32a-c through dynamic load balancing, such as further described below beginning with reference to FIG. 5. Each agent console 32a-c provides the primary means for direct customer interaction by providing service provisioning and related assistance to callers, such as further described below with reference to FIG. 3. The main purpose of each agent console 32a-c is to execute one or more agent applications, which display both user and agent messages and provide menus of actions that can be executed in response to agent commands, including script execution. One or more agent applications execute on each agent console and one or more agent consoles can execute in parallel. Alternatively, multiple instances of agent applications can run on a server machine and can be accessed by agents at agent consoles operating as remote terminals.

Each component, including the message server 31, recognition server 34, and agent consoles 32a-c, is implemented as a computer program, procedure or module, or state transition written as source code or flow specification in a conventional programming language, such as the C++ programming language or modeling tool, and presented for execution by a computer system as object or byte code. Alternatively, the components could be directly implemented in hardware, either as integrated circuitry or burned into read-only memory components. The various implementations of the source code and object and byte codes can be held on a computer-readable storage medium.

Exemplary Typical Call Sequence

Figure 3:
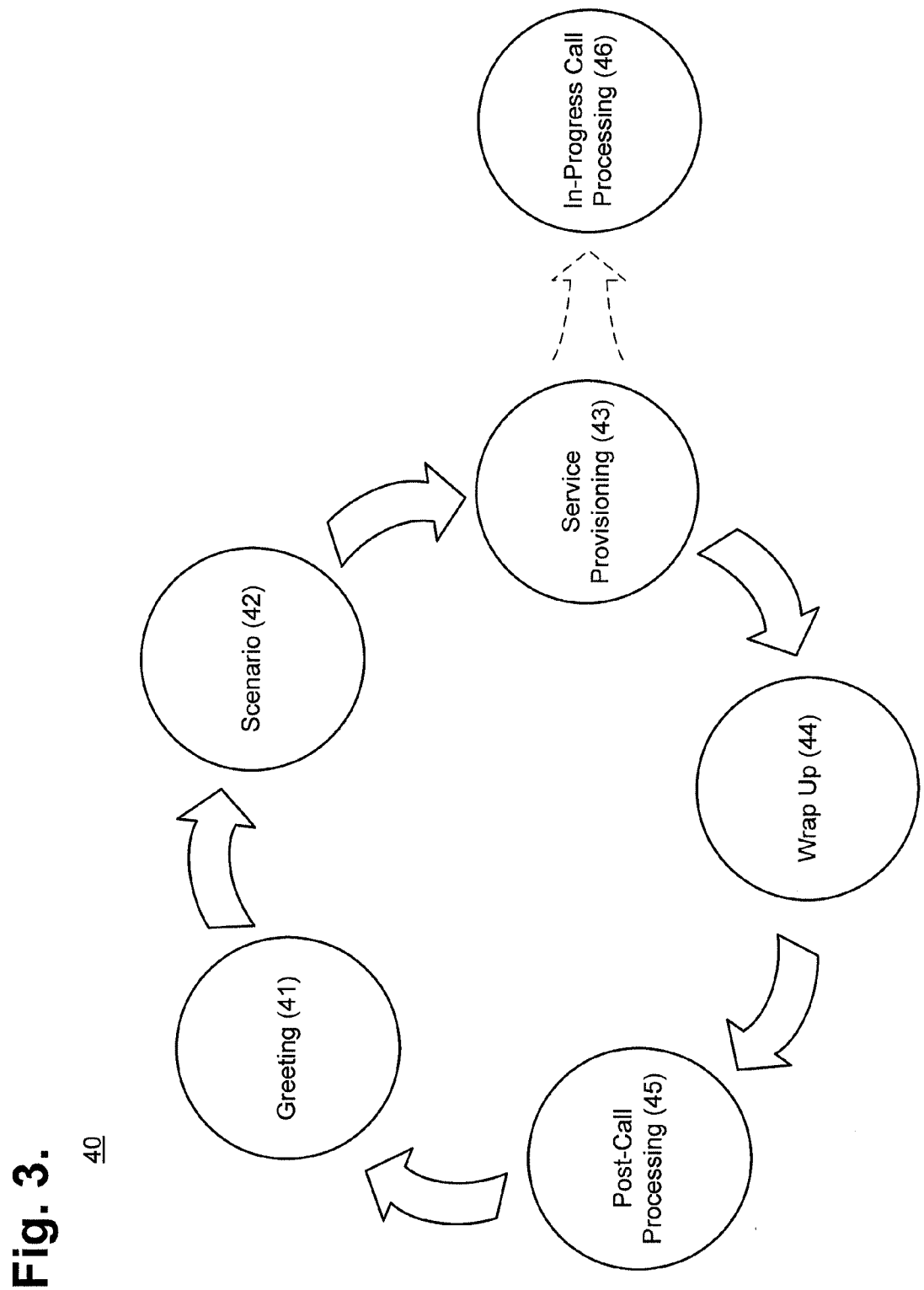
FIG. 3 is a process flow diagram showing, by way of example, a typical call sequence, as transacted in the automated call center of FIG. 2.

Callers to the automated call center interface indirectly with an agent, who multitasks through one or more individual caller sessions via an agent console 32a-c. The callers, however, only perceive an automated calling interface heard, for instance, through their telephone or portable handset. Calls are processed through a sequence of phases. FIG. 3 is a process flow diagram showing, by way of example, a typical call sequence 40, as transacted by the automated call center 30 of FIG. 2. Although the form of call processing required may vary by subject matter area and other factors, the same overall sequence of caller-to-agent interchanges will loosely apply.

Initially, upon calling into the automated call center 30, each user receives an initial greeting and optionally informational message 41 providing a synopsis of caller options. When provided, the caller options enable the user to navigate through to a specific topic area for assistance or support. However, the user could simply proceed directly into a customer support scenario 42 with either an agent, which is a live person; with a guide, which is an automated prompt that is under the supervision of a live person; or through automated voice response to enable information collection, problem trouble-shooting, and other actions. When present, the guide can listen to and revise caller replies in the background, generally unbeknownst to the caller, such as described in commonly-assigned U.S. Pat. No. 7,292,689, entitled "System and Method for Providing a Message-Based Communications Infrastructure for Automated Call Center Operation," issued Nov. 6, 2007 to Odinak et al., the disclosure of which is incorporated by reference.

The scenario 42 can be delayed by agent unavailability, caller volume capacity limits, and other factors that can delay providing a response to the caller. Throughout the session, the agent can adjust and customize the flow of the call processing by evaluating caller attributes, such as further described in commonly-assigned U.S. Provisional Patent application, entitled "System and Method for Managing a Dynamic Call Flow During Automated Call Processing," Ser. No. 60/838, 101, filed Aug. 15, 2006, the disclosure of which is incorporated by reference. In addition, the order in which information is gathered from the user to assist with problem resolution, such as identifying the caller's needs or troubleshooting a problem, can be dynamically evaluated and controlled, such as further described in commonly-assigned U.S. Provisional Patent application, entitled "System and Method for Processing Out-Of-Order Caller Responses During Automated Call Processing," Ser. No. 60/838,102, filed Aug. 15, 2006, the disclosure of which is incorporated by reference.

As required, service provisioning 43 is provided to the user, either directly during the course of the call or indirectly through a service request dispatch. The type of service provided can include sending information or products, entering a subscription or enrollment, or other forms of commerce or assistance that can be remotely provided over the telephone. Finally, the call ends in a wrap-up 44, which provides closure to the call and a departing salutation. Other forms and variations of customer call sequences are feasible. Importantly, however, from the perspective of the caller, the experience may appear to be an interaction with an intelligent machine and the caller would thus be aware that the agent is automated, not human. Accordingly, the caller would have a more relaxed expectation of agent responsiveness since a machine, and not an actual person, is on the line.

Following call termination, the automated call center 30 can perform post-call processing 45, which identifies individual speech utterances in each call that can be analyzed or stored into a database 34. The identified speech utterances can be presented to an agent for manipulation, such as ranking or reordering. In addition, the post-call processing 45 can include performing speech recognition on the speech utterances, identifying speaker characteristics, and marking certain speech utterances for later use. In a further embodiment, the automated call center 30 can also perform in-progress call processing 46, which operates on a stream of speech utterances copied from on-going calls. The same types of processing operations can be performed as on completed calls, but allows an agent to perform real time call analysis.

Exemplary Agent Console

Figure 4:
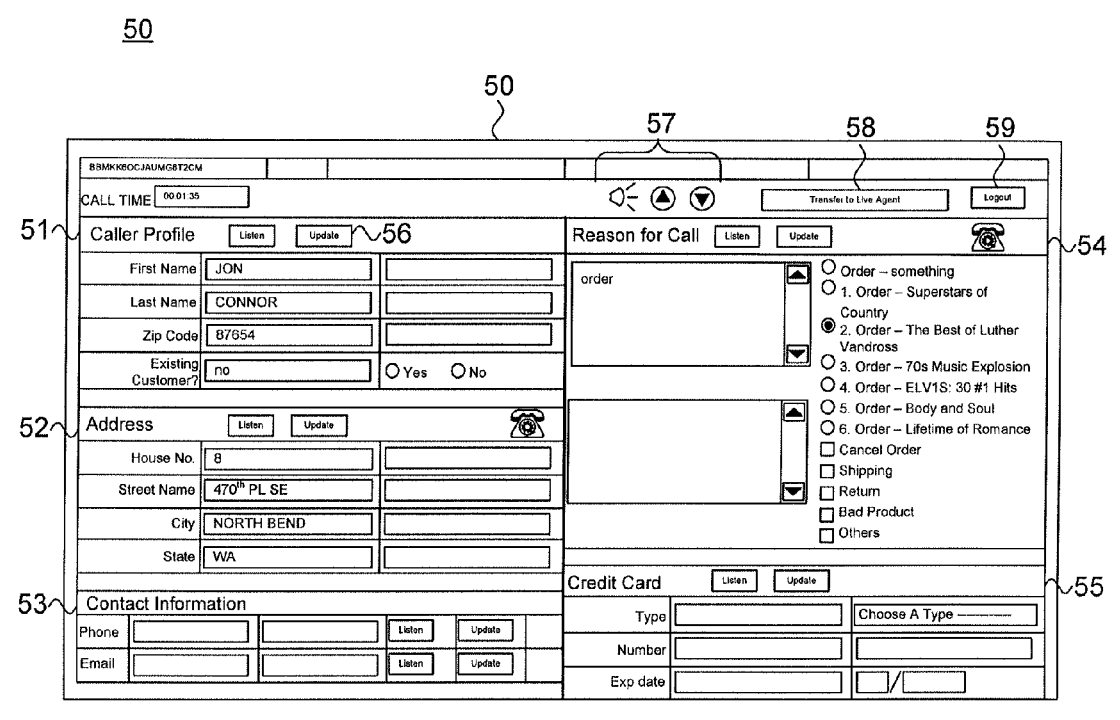

Call sessions are displayed on each agent console through a graphical user interface (GUI). FIG. 4 is a screen diagram showing, by way of example, a view of an agent console 50 for a live call session. Multiple call sessions can be simultaneously displayed and managed through the GUI controls.

The particulars concerning the live call session are obtained by the message server 31 and provided to the agent. The session particulars can include, for instance, caller profile 51, address 52, contact information 53, reason for call 54, and credit card data 55. Other types of session particulars are possible.

Operationally, the agent can review a recording of the caller's spoken responses through intuitive playback controls 57 and update the display by operating an "Update" control 56. Additionally, the agent can transfer the caller to a live agent by operating a "Transfer to Live Agent" control 58 and can log out by operating a "Logout" control 59. Other GUI controls are possible.

Agent Console Load Balancing

Each call is handled principally by a single agent through an agent console 32*a-c*. However, prior to undertaking a session with a caller, the message server 31 determines the abilities of a community of agents to handle additional sessions through a continuing evaluation of agent load. FIG. 5 is a process flow diagram showing a method 70 for balancing agent console load during automated call processing, in accordance with one embodiment. Individual load factors are determined by each agent console 32*a-c*, while the actual assignment of caller sessions to agent consoles 32*a-c* is performed by the message server 31. Other delegations of load factor determination and session assignment are possible.

Initially, a new incoming call is received (operation 71) by the message server 31 through the telephony interface 35. The message server 31 continually updates the conditions that can affect the ability of each agent, through their respective agent console 32*a-c*, to handle additional sessions by evaluating several on-going conditions (operation 72), as further described below with reference to FIG. 6. A load factor is determined (operation 73) by each agent console 32*a-c*, as further described below with reference to FIG. 7, and is provided to the message server 31, which will then assign the call (operation 74), typically to the agent console 32*a-c* with the lowest load factor. However, if no agent is available, that is, every agent console 32*a-c* has a load factor set to the maximum sessions allowed, the message server 31 will undertake an alternative call disposition by either handling the call without a guide through automated response (operation 76), transferring the call to a live agent, or placing the caller on hold (operation 75). Processing of unassigned calls is repeated for each new caller.

Evaluated Conditions

Figure 6:
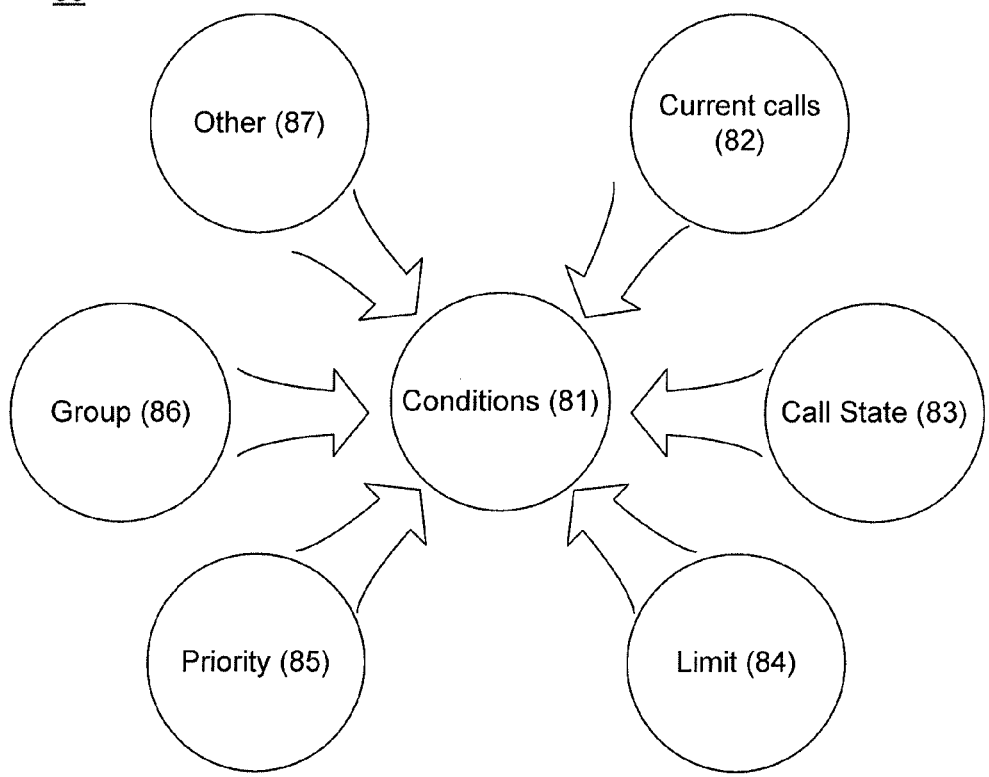
FIG. 6 is a block diagram showing, by way of example, conditions evaluated during agent console load balancing.

Conditions are evaluated by both the message server 31 and each agent console 32*a-c* on an on-going basis. FIG. 6 is a block diagram showing, by way of example, conditions 80 evaluated 81 during agent console load balancing. The particular conditions evaluated can be objective measures that exist independently of agent discretion, and subjective factors, which require individual agent assessment. Objective conditions can be known by the message server 31 and agent console 32*a-c* alike, whereas subjective conditions are initially known only to the agent until the agent stores or send the subjective conditions to the other systems.

Conditions 81 are evaluated and exchanged continually. The conditions 81 can include the current number of calls 82 being handled by each agent console 32a-c, the state of the call 83, such as "pending resolution" or "awaiting caller reply," limits on maximum number of sessions 84 for a particular agent, priority of caller 85, and group to which the agent is assigned 86. Other conditions 87 include the subjective impression of the difficulty perceived by the agent to resolve a caller's concerns or the difficulty being experienced by the agent in dealing with the personality of a caller. Still other conditions are possible.

Load Factor Determination

Figure 7:
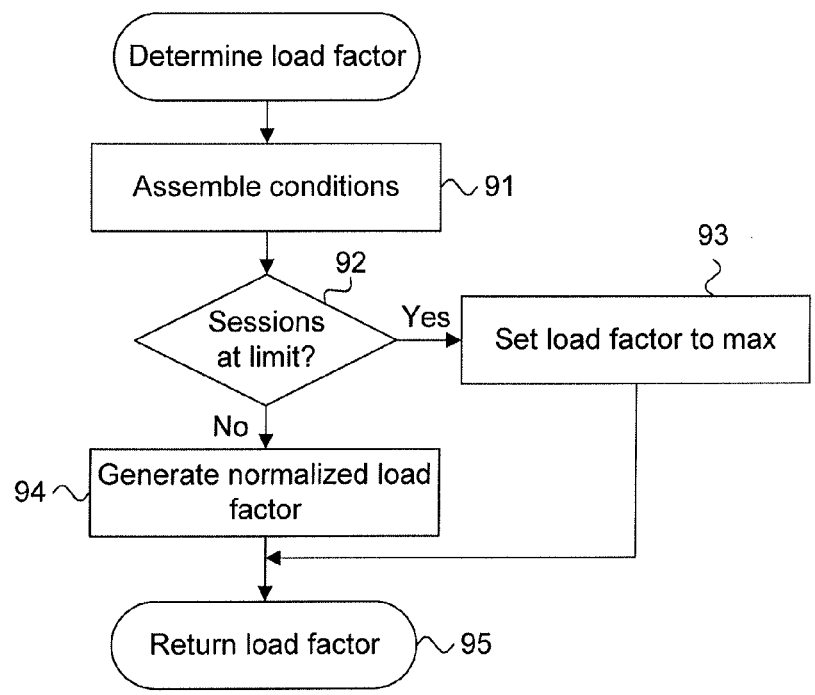
FIG. 7 is a flow diagram showing a routine for load factor determination.

A load factor is a numerical metric for approximating the ability of an agent console 32a-c to receive an additional call session assignment. FIG. 7 is a flow diagram showing a routine 90 for load factor determination. Load factors can be determined by either the message server 31, responsible agent console 32a-c, or other system having access to the conditions 81.

Initially, all of the currently known conditions 81 are assembled by the evaluating system (block 91). Although the conditions 81 are continually collected, those conditions 81, in the process of being tallied, for instance, may be temporarily unavailable at the time of assembly. Each agent console 32a-c is subject to an absolute upper limit on the number of maximum sessions allowed. If the number of sessions for a particular console 32a-c is at the limit (block 92), the load factor is set to an arbitrary maximum value (block 93). Otherwise, if the session limit has not been reached (block 92), a normalized load factor is generated (block 94). Finally, the load factor is returned from the routine (block 95), which includes sending the load factor to the message server 31 if the load factor was determined by the responsible agent console 32a-c.

A load factor can be determined as a normalized numeric metric on a per console basis. The load factor can be determined whether the maximum number of sessions per console is limited or unspecified. The load factor $LF_i$ is normalized over the scaling factor m, such that $0 \leq LF_i \leq m$. Where the number of sessions that can be assigned to an agent console is upper bounded, the load factor $LF_i$ for each agent console i can be evaluated per equation (1) as:

$$LF_i = \begin{cases} 0, & s_i = 0 \\ \text{ceil}\left(m \frac{\sum_{j=1}^{s_i} t_{ij} s_i}{(w l_i^2)}\right), & s_i < l_i \\ m, & s_i = l_i \end{cases} \quad (1)$$

where m is a scaling factor; $s_i$ is the number of sessions currently assigned to an agent console i; $t_{ij}$ is the current state of a session in the agent console i; $l_i$ is the maximum number of sessions allowed for agent the console i, such that $l_i \geq 0$; and w is the number of windows that are viewable on the agent console i, such that $0 \leq i \leq l_i$.

In one embodiment, m=400 and w=4, although other values are possible. In addition, the current state $t_{ij}$ is set to one of three values:

waiting (RED): 4
attention (YELLOW): 2
active (GREEN): 1

Other state values, either in lieu of or in combination with the foregoing state values are possible.

Where the number of sessions that can be assigned to an agent console is not specified, the load factor $LF_i$ for each agent console i can be evaluated per equation (2), which is a generalization of equation (1), as:

$$LF_i' = \begin{cases} 0, & s_i = 0 \\ \text{ceil}\left(m \frac{\sum_{j=1}^{s_i} t_{ij} s_i}{w}\right), & s_i < l_i \\ m, & s_i = l_i \end{cases} \quad (2)$$

Operationally, limiting the maximum number of sessions that can be assigned to an agent console provides load balancing better attuned to current conditions and agent abilities, as the more generalized form of load factoring does not reflect the capability of a particular agent console that is implicit in the upper limit. Thus, where equation (2) would indicate that the agent console having the lowest load factor should receive the next caller assignment, equation (1) would qualify the recommendation based upon the relative ability of that agent console to handle an additional caller assignment. Consequently, a first agent console with more assigned callers may still be preferred over another agent console with few assigned callers if the maximum number of sessions for that first console is higher than the other agent console's limit.

Agent Console

Figure 8:
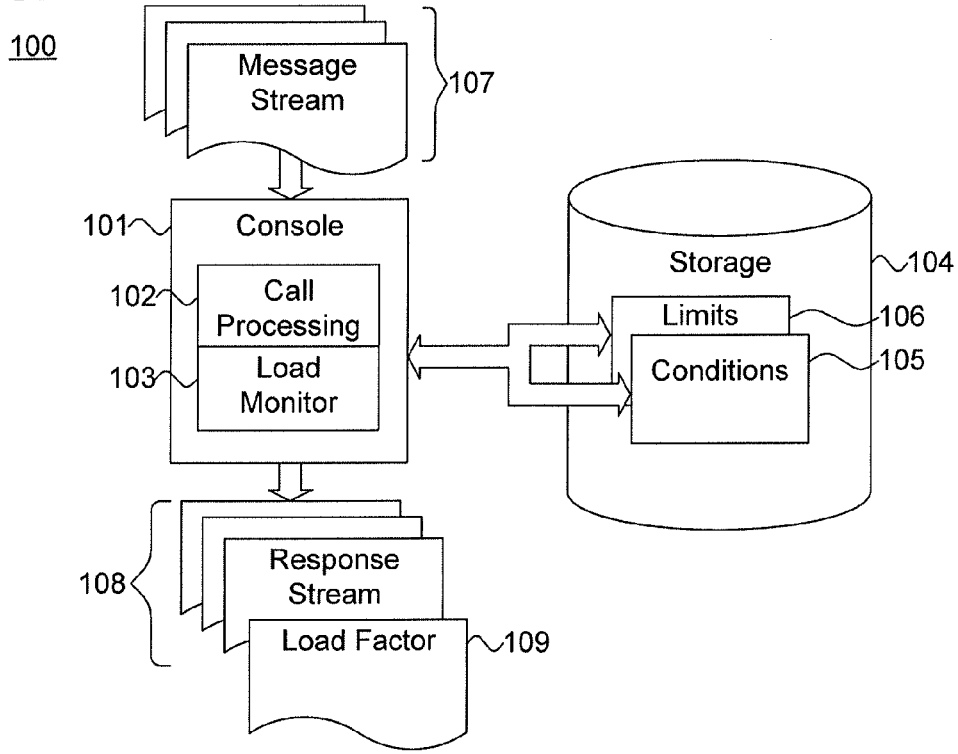
FIG. 8 is a block diagram showing a system for balancing agent console load during automated call processing, in accordance with one embodiment.

Generally, each agent console 32a-c has access to the most up-to-date information regarding the conditions pertaining to load factor determination. FIG. 8 is a block diagram showing a system 100 for balancing agent console load during automated call processing, in accordance with one embodiment. The message server 31, or other agent console 32a-c, could also determine load factors if given access to the appropriate data. The system 100 operates in accordance with a sequence of process steps, as further described above with reference to FIG. 5.

Each agent console 101 processes a stream of caller messages 107 and generates a stream of agent responses 108, as well as a load factor 109, which is provided to the message server 31 periodically or upon demand. The console 101 includes a call processing module 102, which processes the message stream 107 to provide service provisioning 43 (shown in FIG. 3) and provides other caller interactions.

The console 101 also includes a load monitor 103, which continually assembles a set of conditions 105, which are stored in a storage device 104. The load monitor 103 determines the load factor 109 by evaluating the conditions 105 against fixed limits 106 that are assigned to the agent and also stored in the storage device 104. Other console operations are possible.

Load Factor Determination with Starvation Control

Ordinarily, if no agent is available, the message server 31 will undertake an alternative call disposition, as described above with reference to FIG. 5. However, a starvation condition can occur when all except one of the agent consoles 32a-c are unavailable due to maximum load factors and the message server 31 is unable to either assign a new call to the last remaining agent console 32a-c, transfer the call, or place the caller on hold. The starvation condition arises where the last remaining agent console 32a-c, which also has the current lowest load factor, has just accepted a call and is temporarily not accepting new calls. The agent console's temporary unavailability results in a deadlock, as the message server 31 still assumes that the agent console can accept calls and will not attempt another call disposition. As a result, starvation occurs.

Figure 9:
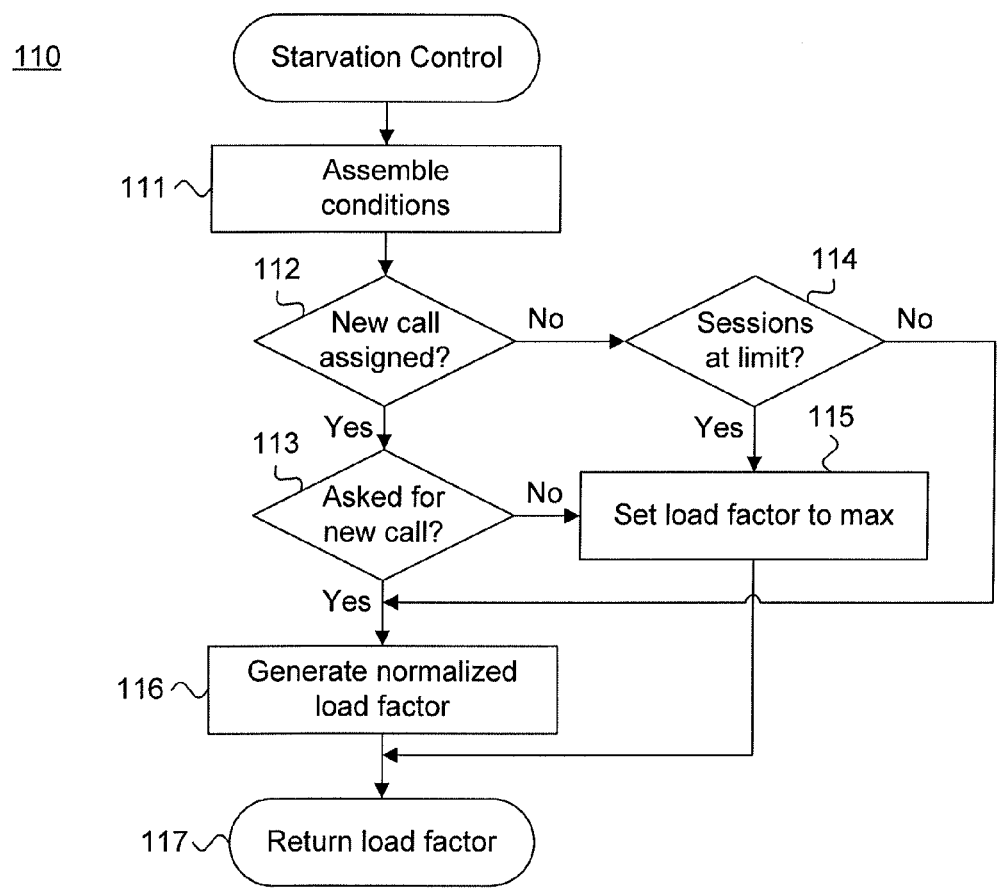
FIG. 9 is a flow diagram showing a routine for load factor determination with starvation control, in accordance with a further embodiment.

The starvation condition can be avoided by updating the load factor to reflect agent console availability. FIG. 9 is a flow diagram showing a routine 110 for load factor determination with starvation control, in accordance with a further embodiment. The load factor is set to the maximum value immediately after each agent console 32a-c has accepted a new call and remains at the maximum value until the agent console is again accepting new calls, after which the load factor is normally determined.

Initially, all of the currently known conditions 81 are assembled by the evaluating system (block 111). If the agent console 32a-c has just accepted a new call (block 112), but has not asked for a new call (block 113), that is, the agent console is temporarily unavailable, the load factor is set to an arbitrary maximum value (block 115). Similarly, if the agent console has not accepted a new call (block 112) but the number of sessions for that console is at the limit (block 114), the load factor is also set to the arbitrary maximum value (block 115). Otherwise, a normalized load factor is generated (block 116) if either the session limit has not been reached (block 114) or the agent console has asked for a new call (block 116). Finally, the load factor is returned from the routine (block 117), which includes sending the load factor to the message server 31 if the load factor was determined by the responsible agent console 32a-c.

While the invention has been particularly shown and described as referenced to the embodiments thereof, those skilled in the art will understand that the foregoing and other changes in form and detail may be made therein without departing from the spirit and scope of the invention.

What is claimed is:

1. A system for balancing call assignments on an agent console during automated call processing, comprising:
an automated call center to assign a plurality of incoming calls;
a call monitor to monitor the incoming calls and two or more agent consoles each managed by an agent;
a console load balance module to assign an absolute upper limit on a number of the calls allowed at each agent console at any given time; and
a message server to balance a load of call assignments on each agent console, comprising:
a server load balance module to collect objective conditions regarding calls already assigned to each agent, to further collect subjective conditions regarding the agent's opinion of at least one of the assigned calls, and to evaluate the objective and subjective conditions against the absolute upper limit to determine a load factor of each agent console;
a call distributor to assign one of the incoming calls to one of the agent consoles with the determined load factor having a lowest value; and
a call assignment module to assign a maximum load factor to the agent console with the lowest load factor that received the one such incoming call.

2. A system according to claim 1, wherein the server load balance module assigns a maximum load factor to each agent console when a number of the assigned calls reach the absolute upper limit on the number of maximum calls for that agent console.

3. A system according to claim 1, wherein the objective conditions comprise at least one of a number of the current calls handled by each agent, a state of the current calls, a priority of a caller, and a group to which each agent is assigned.

4. A system according to claim 1, wherein the subjective conditions comprise at least one of a difficulty perceived in dealing with a caller and a difficulty of resolving concerns of the caller.

5. A system according to claim 1, further comprising:
a suspension module to temporarily suspend assignment of one such incoming call to each agent that has recently received one of the incoming calls.

6. A system according to claim 1, further comprising:
a call disposition module to perform call disposition when none of the agents are available to handle one such incoming call, comprising at least one of handling the one such incoming call through automated response, transferring the one such incoming call to a live agent, and placing a caller associated with the one such incoming call on hold.

7. A system according to claim 1, further comprising:
a display module to display at least one of the assigned calls on each agent console.

8. A system according to claim 1, wherein the absolute upper limit differs for one or more of the agent consoles based on a capability of that agent to accept one such incoming call.

9. A method for balancing call assignments on an agent console during automated call processing, comprising:
assigning a plurality of incoming calls;
monitoring the incoming calls and two or more agent consoles each managed by an agent;
assigning an absolute upper limit on a number of the calls allowed at each agent console at any given time; and
balancing a load of call assignments on each agent console, comprising:
collecting objective conditions regarding calls already assigned to each agent and further collecting subjective conditions regarding the agent's opinion of at least one of the assigned calls;
evaluating the objective and subjective conditions against the absolute upper limit to determine a load factor of each agent console;
assigning one of the incoming calls to one of the agent consoles with the determined load factor having a lowest value; and
assigning a maximum load factor to the agent console with the lowest load factor that received the one such incoming call.

10. A method according to claim 9, further comprising:
assigning a maximum load factor to each agent console when a number of the assigned calls reach the absolute upper limit on the number of maximum calls for that agent console.

11. A method according to claim 9, wherein the objective conditions comprise at least one of a number of the current calls handled by each agent, a state of the current calls, a priority of a caller, and a group to which each agent is assigned.

12. A method according to claim 9, wherein the subjective conditions comprise at least one of a difficulty perceived in dealing with a caller and a difficulty of resolving concerns of the caller.

13. A method according to claim 9, further comprising:
temporarily suspending assignment of one such incoming call to each agent that has recently received one of the incoming calls.

14. A method according to claim 9, further comprising:
performing call disposition when none of the agents are available to handle one such incoming call, comprising at least one of:

handling the one such incoming call through automated response;

transferring the one such incoming call to a live agent; and placing a caller associated with the one such incoming call on hold.

15. A method according to claim 9, further comprising:

displaying at least one of the assigned calls on each agent console.

16. A method according to claim 9, wherein the absolute upper limit differs for one or more of the agent consoles based on a capability of that agent to accept one such incoming call.

* * * * *